(12) United States Patent
Andersen et al.

(10) Patent No.: US 6,347,934 B1
(45) Date of Patent: Feb. 19, 2002

(54) SYSTEM FOR METERING AND DELIVERING A MOLDABLE COMPOSITION INTO A MOLD

(75) Inventors: Per Just Andersen; Kristopher R. Turner, both of Santa Barbara, CA (US); Matthew E. Laine, Severna Park, MD (US); David A. Dellinger, Santa Barbara, CA (US)

(73) Assignee: E. Khashoggi Industries, LLC., Santa Barbara, CA (US)

( * ) Notice: Subject to any disclaimer, the term of this patent is extended or adjusted under 35 U.S.C. 154(b) by 0 days.

(21) Appl. No.: 09/568,638

(22) Filed: May 10, 2000

(51) Int. Cl.[7] .............................................. B29C 45/43
(52) U.S. Cl. ...................................... 425/557; 425/561
(58) Field of Search ................................ 425/145, 407, 425/510, 557, 558, 559, 560, 561

(56) References Cited

U.S. PATENT DOCUMENTS

| | | | |
|---|---|---|---|
| 3,760,984 A | 9/1973 | Theeuwes | 222/95 |
| 3,992,003 A | 11/1976 | Visceglia et al. | 272/94 |
| 4,059,107 A | 11/1977 | Iriguchi et al. | 128/173 |
| 4,290,701 A | 9/1981 | Schad | 366/77 |
| 4,340,054 A | 7/1982 | Michaels | 128/260 |
| 4,534,493 A | 8/1985 | Sedran | 222/146.2 |
| 4,771,726 A | 9/1988 | Fitch, Jr. | 118/25 |
| 4,813,870 A | 3/1989 | Pitzen et al. | 433/90 |
| 4,867,665 A * | 9/1989 | Wada | 425/145 |
| 4,925,381 A | 5/1990 | Aoki et al. | 425/145 |
| 4,966,545 A | 10/1990 | Brown et al. | 425/557 |
| 5,112,212 A | 5/1992 | Akselrud et al. | 425/557 |
| 5,183,185 A | 2/1993 | Hutcheson et al. | 222/209 |
| 5,192,555 A | 3/1993 | Arnott | 425/544 |
| 5,200,207 A | 4/1993 | Askelrud et al. | 425/557 |
| 5,260,012 A | 11/1993 | Arnott | 264/69 |
| 5,304,331 A | 4/1994 | Leonard et al. | 264/141 |
| 5,376,320 A | 12/1994 | Tiefenbacher et al. | 264/50 |
| 5,441,173 A | 8/1995 | Koval et al. | 222/63 |
| 5,536,164 A | 7/1996 | Brun, Jr. et al. | 425/547 |
| 5,545,450 A | 8/1996 | Andersen et al. | 428/34.5 |
| 5,624,056 A | 4/1997 | Martindale | 222/148 |
| 5,658,603 A | 8/1997 | Andersen et al. | 425/532 |
| 5,660,900 A | 8/1997 | Andersen et al. | 428/35.6 |
| 5,680,960 A | 10/1997 | Keyes et al. | 222/64 |
| 5,683,772 A | 11/1997 | Andersen et al. | 160/36.4 |
| 5,705,203 A * | 1/1998 | Anderson | 425/407 |
| 5,705,239 A | 1/1998 | Andersen et al. | 428/34.5 |
| 5,755,361 A | 5/1998 | Restive et al. | 222/209 |
| 5,863,487 A * | 1/1999 | Guergov | 264/510 |
| 6,017,210 A | 1/2000 | Takayama et al. | 425/557 |

* cited by examiner

Primary Examiner—Tim Heitbrink
(74) Attorney, Agent, or Firm—Workman, Nydegger & Seeley

(57) ABSTRACT

A system for providing a desired quantity of a mold material into a mold. The system includes an accumulation system and a metering and delivery system. The accumulation system is a temporary reservoir which accepts and stores mold material and then provides the mold material to the metering and deliver system under pressure on demand The accumulation system is exemplified by a cylinder and a pneumatically actuated piston within the cylinder which is capable of selectively withdrawing and advancing so as to accept and then supply mold material under pressure. The metering and delivery system is exemplified by a metering cylinder and a pneumatically actuated metering piston within the cylinder that has a stroke length that defines a volume that substantially corresponds to the volume of mold material that is delivered to the mold. Adjustments to the stroke length of the metering piston may be made in order to fine tune the quantity of mold material that is placed into the mold. The system is particularly well suited for metering and delivering a desired quantity of a Binghamian pseudo-plastic fluid, such as an aqueous starch-based composition used to manufacture foamed, starch-bound articles of manufacture.

20 Claims, 9 Drawing Sheets

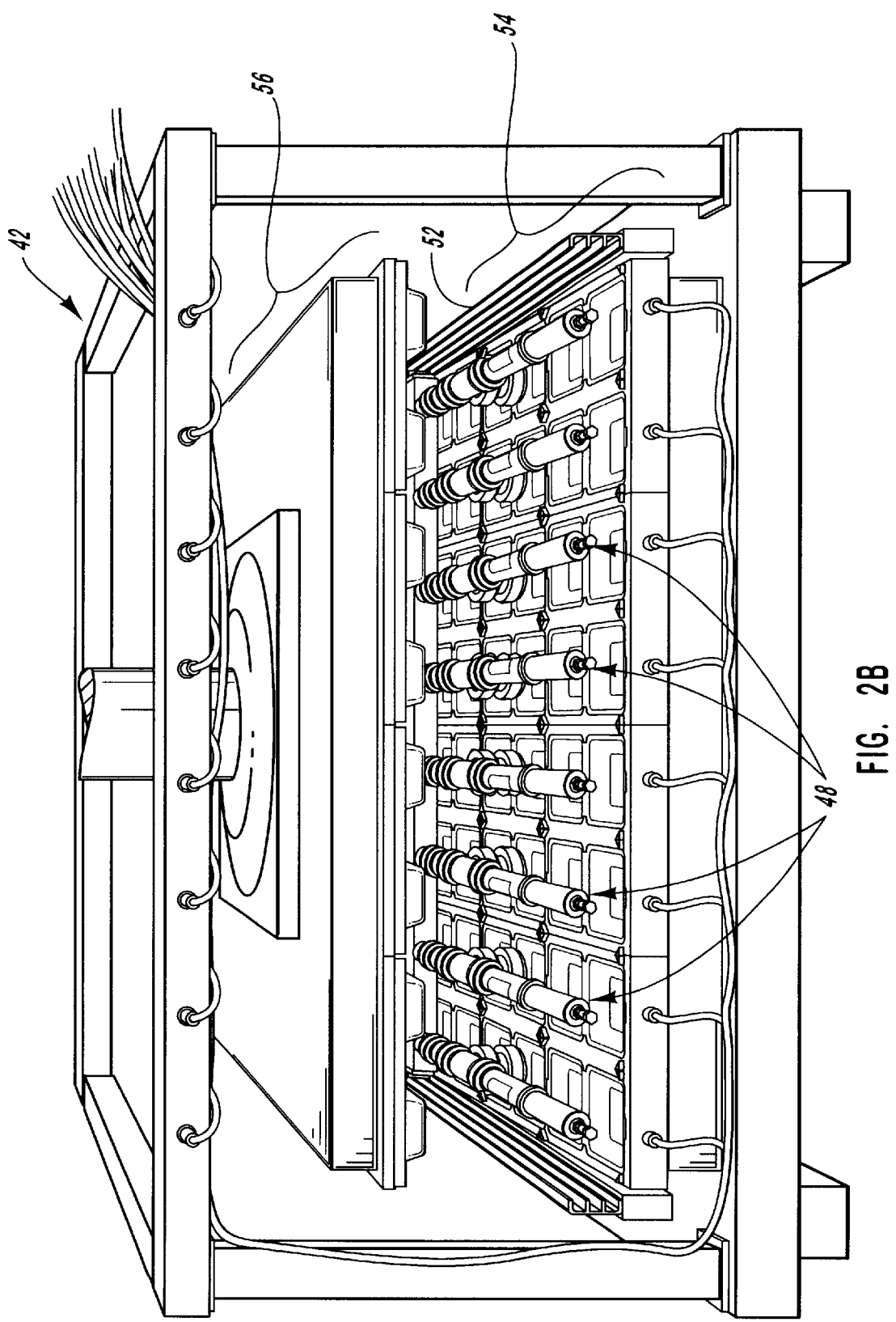

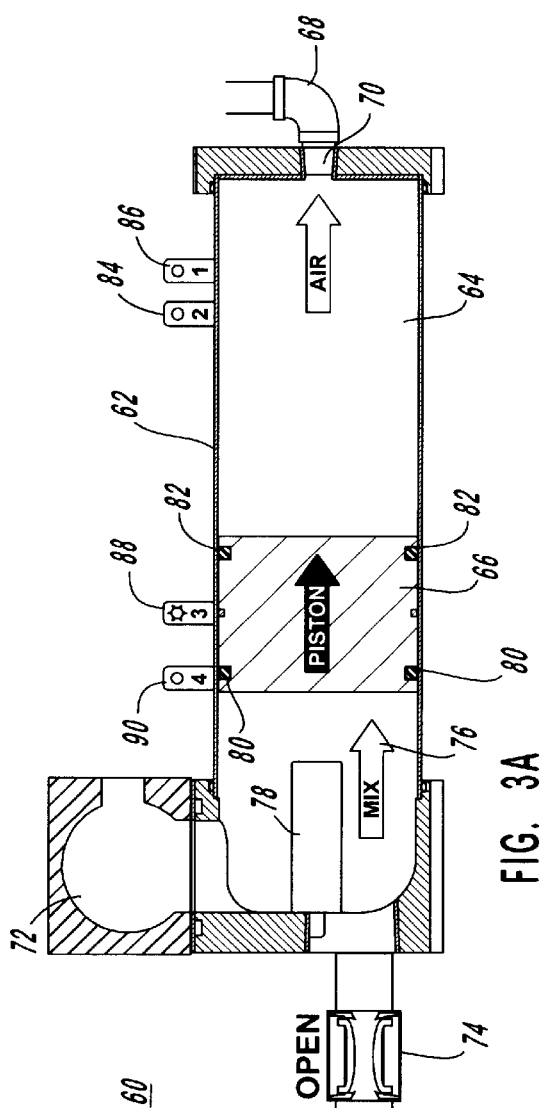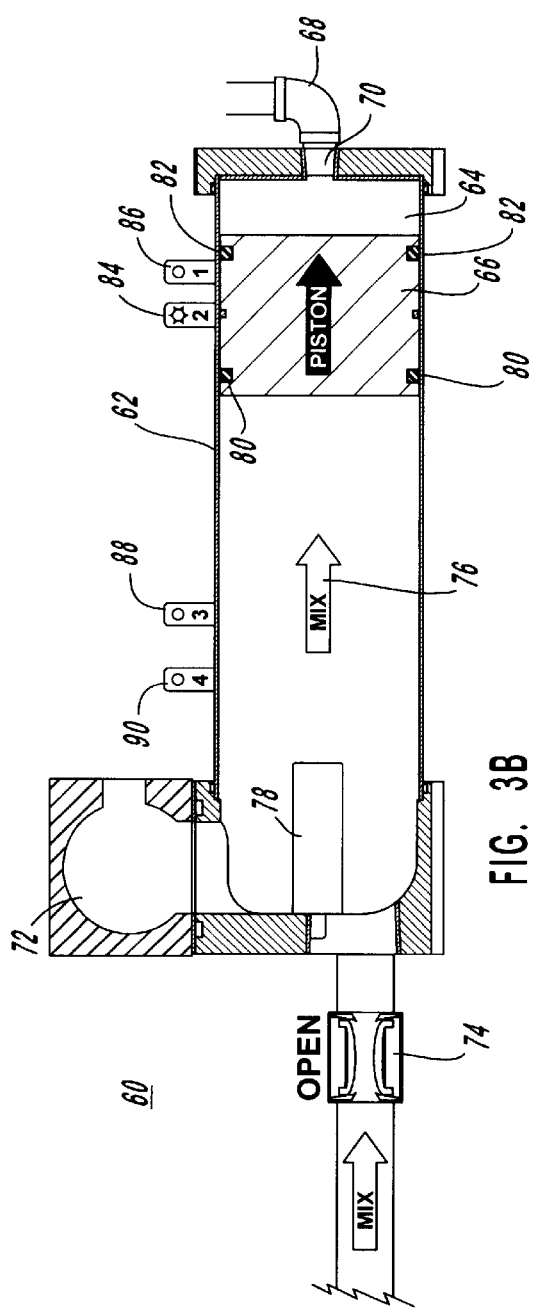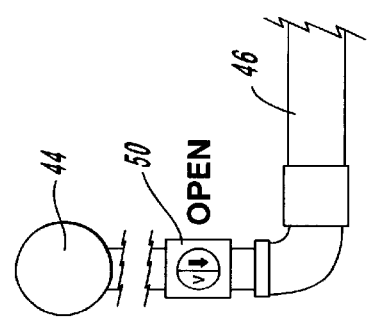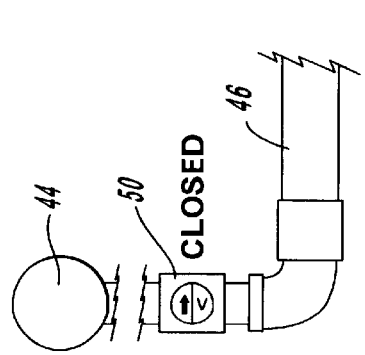
FIG. 3A
FIG. 3B

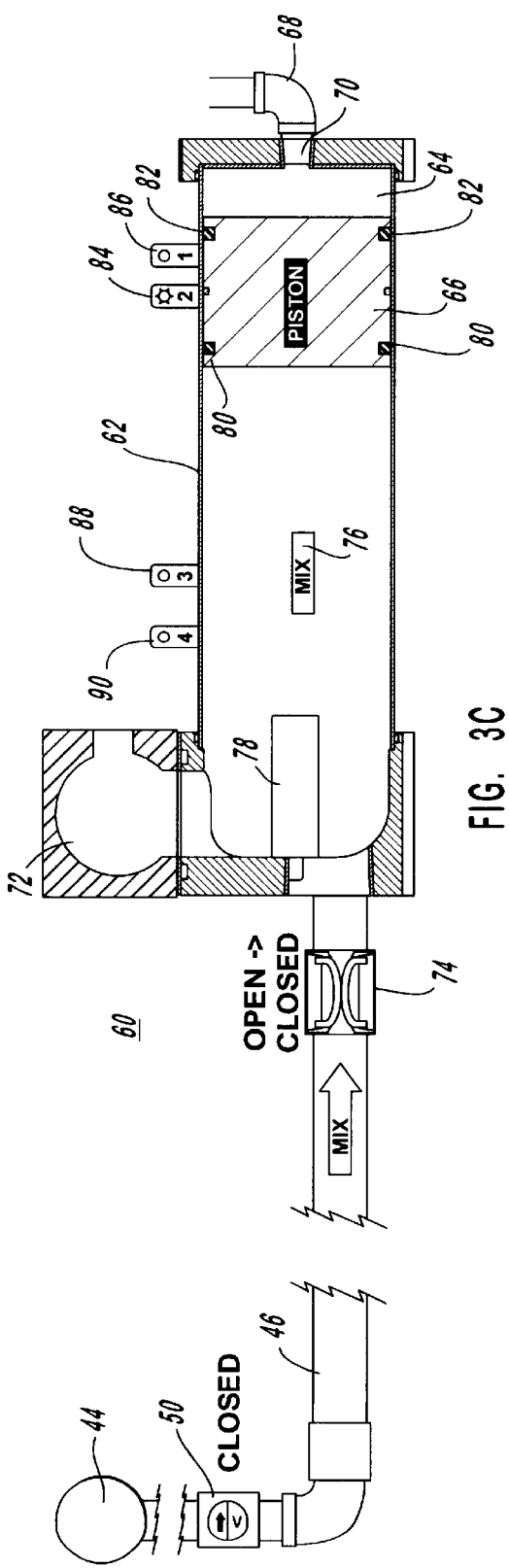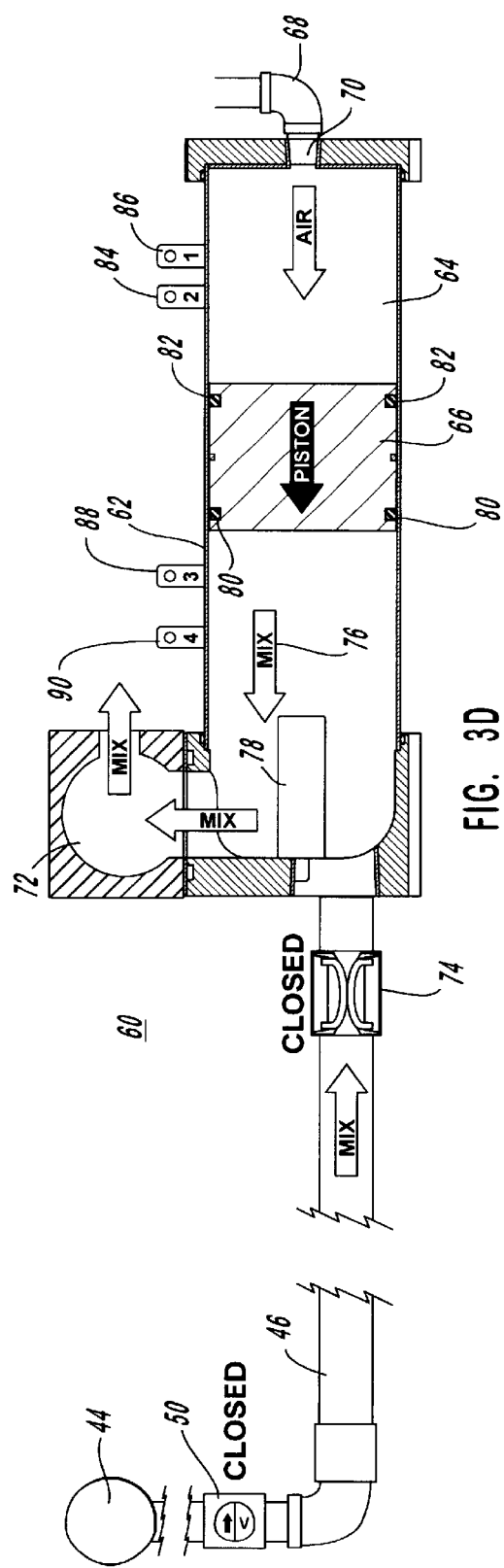

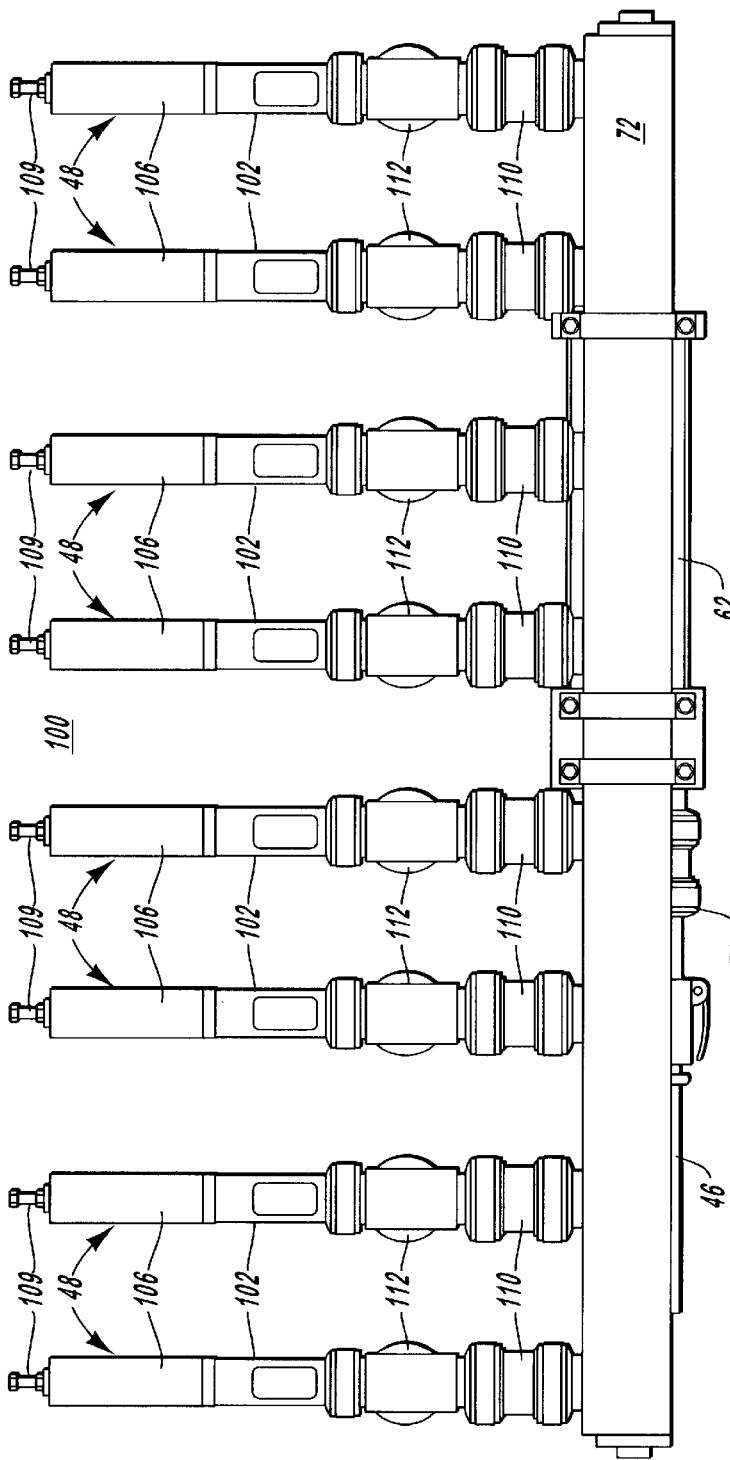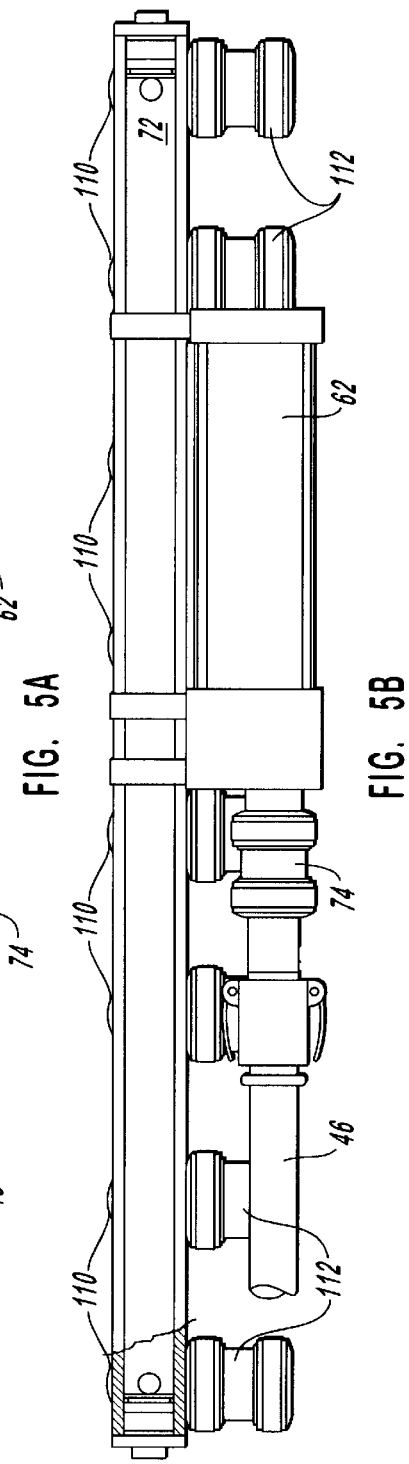
FIG. 5A
FIG. 5B

SYSTEM FOR METERING AND DELIVERING A MOLDABLE COMPOSITION INTO A MOLD

BACKGROUND OF THE INVENTION

1. The Field of the Invention

The present invention relates to the manufacture of molded articles. More particularly, the present invention relates to systems for precisely metering and delivering a desired amount of a moldable composition into a mold, such as aqueous, starch-based compositions.

2. The Relevant Technology

There has been a marked trend in recent years toward finding biodegradable and environmentally friendly alternatives to containers made from polystyrene foam and other plastic materials. The search for environmentally friendly substitutes has been driven by the recognition that polystyrene and other plastics tend to persist in the environment for years, decades, and even centuries before finally breaking down. Some companies, like McDonald's Corporation, have abandoned fast food boxes, cups and other containers made from polystyrene foam and plastic in favor of alternative materials.

More bio-friendly materials, such as starch-based compositions, are of interest in the manufacture of disposable containers and other articles, including cups, clam shell sandwich containers, plates, bowls, boxes and lids. Such compositions may include water, starch and other admixtures to improve processing and final properties. Starch-based plates and other containers manufactured by Biopac Corporation of Sweden were demonstrated at the winter Olympics in Lillihammer, Norway. Such containers were manufactured according to a process described in U.S. Pat. No. 5,376,320 to Tiefenbacher et al. For purposes of disclosing moldable starch-based compositions, the foregoing patent is incorporated herein by reference. Whereas the starch containers developed by Biopac were beneficial from an environmental standpoint, they were expensive to manufacture, both from a materials and processing standpoint.

Improved starch-based compositions that are less expensive to make and to mold into containers have been developed by researchers at E. Khashoggi Industries, LLC and are described in U.S. Pat. Nos. 5,662,731, 5,679,145 and 5,868,824. For purposes of disclosing moldable starch-based compositions, the foregoing patent is incorporated herein by reference.

In general, the manufacture of starch-bound articles having a foamed cellular matrix involves the use of aqueous molding compositions that include water, ungelatinized and pregelatinized starches, fibers, and other desired admixtures. The aqueous starch-based mixtures are introduced into a heated two-part mold in order to (1) gelatinize the ungelatinized starch portion and (2) remove at least a portion of the water by evaporation in order to yield a form stable molded article. The vaporizing water also causes the moldable composition to expand and fill the mold cavity. Venting means such as vent holes allow for escape of water vapor from the mold cavity and associated expansion of the starch-based mixture.

In order to ensure proper formation and density of the molded article, it is necessary to meter and deliver an optimum quantity of the moldable composition into the mold, typically a two-part mold including male and female mold halves. As stated above, the aqueous compositions typically expand to fill the mold cavity. If too little of the composition is introduced into the mold, it may not properly expand and fully fill the mold cavity, thus yielding incompletely formed articles which must be culled and discarded. On the other hand, introducing too much starch-based composition into the mold may result in excessive pressure build-up within the mold cavity, which can also result in improperly formed or damaged articles. In addition, excess mold material expelled through the vent holes typically remains attached to the molded article as unwanted "flashing" that must be removed and which can cause scarring or breakage of the article at the point where the flashing is broken off. In view of this, one would expect the failure rate when molding starch bound articles to be greatly reduced the amount of composition that introduced into the mold each time can be more precisely metered and delivered.

In a typical process the starch-based composition is mixed together batch-wise and then pumped through hoses to the mold site where it is intermittently dropped or expelled into the molds. One system for introducing the starch-based material into the molds consists of an aperture and shutter arrangement. Initially, the shutter covers the aperture and prevents the pressurized starch-based composition from exiting the aperture. When it is desired to introduce a quantity of material into the mold, the shutter is opened for predetermined duration and then closed. In theory, the speed and duration of this opening and closing action can be calibrated in relation to the pressure and rheology of the molding composition in order to introduce a desired amount of the composition into the mold each time. In reality, there are simply too many changing variables for such a system to accurately and precisely deliver the desired quantity of material into the molds during each and every cycle.

The inability of the aperture/shutter valve system to precisely and accurately deliver the same quantity of material during each cycle is due to a number of changeable variables. One variable is the pressure of the starch-based composition being delivered to the mold system. Assuming that the shutter speed and open dwell time are calibrated according to the specific mold requirements and the assumed pressure of the starch-based composition, even slight variations in the actual pressure of the starch-based composition can cause deviations in the amount of material actually delivered. If the pressure is higher than what is assumed, too much of the starch-based composition will be delivered; conversely, if the pressure is lower than what is assumed, too little of the material will be delivered.

Another variable is the rheology of the starch-based composition, including both the viscosity and yield stress of the material. Once again, even slight variations of mixture rheology can affect the flow rate of the material through the aperture. Such discrepancies in flow rate are only exacerbated when multiple valves are used, since it is difficult to ensure that every value experiences the same pressure and associated flow rate. Ensuring an even flow rate throughout all the valves would require a very complicated delivery system.

One way to overcome these problems might be to have a computer monitored system that could continuously monitor the foregoing variables and adjust the individual valve shutter speeds in order to maintain close tolerances of the quantity of material being delivered. In practice such an arrangement would be difficult to implement, particularly because the correction mechanism would only be triggered when deviations were actually detected. Such variations will likely have already resulted in poorly formed containers before corrective measures can be made. Moreover, a highly complicated system of measuring transducers, information relays, computer algorithms, individual speed and timing adjustments to each valve, and other required equipment for such a correction system would be extremely complicated and would tend to further increase the already high initial capital costs of setting up a manufacturing line. Moreover, careful calibration of all the equipment would be necessary from time to time in order to ensure that the information feedback and correction system would actually work as intended.

In view of the foregoing, what is needed are improved methods and systems for metering and delivering a precisely measured quantity of a flowable composition into a mold.

It would be a further improvement in the art to provide methods and systems for metering and delivering a precisely measured quantity of a flowable composition which did not change in response to fluctuations in pressure and rheology of the mold material.

It would also be an improvement in the art to provide methods and systems for metering and delivering a precisely measured quantity of a flowable material without regard to the number of valves and without regard to whether they are arranged in series or in parallel in relation to the pressurizing means.

It would additionally be an improvement in the art to provide methods and systems for metering and delivering a precisely measured quantity of a flowable material which avoided, or at least reduced, the problems inherent in both under filling and over filling the mold.

More particularly, it would be a tremendous advancement in the art if such methods and systems prevented or reduced the incidence of inadequately formed or collapsed articles and well as the quantity flashing that is attached to the demolded articles.

Such methods and systems for metering and delivering a precisely measured quantity of a flowable material to a mold apparatus are disclosed and claimed herein.

SUMMARY AND OBJECTS OF THE INVENTION

The present invention relates to apparatus and systems for providing a precise quantity of a flowable mold material into a mold during the fabrication of molded articles. In particular, the present invention relates to systems that allow for the precise, repeatable delivery of a predetermined quantity of a flowable material, particularly an aqueous starch-based composition, into a mold during each molding cycle in the manufacture of starch-bound articles. The ability to precisely meter and deliver a desired quantity of the mold material results in a more efficient molding process, with fewer articles being damaged due to under- or over-filling the molds and less excess flashing being produced during the molding process.

In general, the inventive metering and delivery systems according to the invention include three basic sections: (1) mixing means for mixing together a desired molding composition that will be inserted into the mold apparatus; (2) accumulation means for receiving and temporarily storing one or multiple batches of the mold material; and (3) delivery means for metering and delivering a precise quantity of the mold material from the accumulation means into an appropriate mold apparatus. These subsystems may advantageously be integrated to yield a fully automated metering and delivery system.

The mixing means typically includes a mixing vessel and a mechanical stirring device capable of imparting a desired level of high or low shear mixing. The mixing means may be capable of producing a desired mold composition batch-wise or on a continuous basis. In the case of a mixer capable of continuous feeding and mixing of mold mixture components, the resulting mold material may be continuously fed or pumped to an intermediate storage unit, or it may be delivered directly to the mold apparatus. In the case of a mixer that produces mold material batch-wise, the mold material will typically be transferred in batches to a hopper, which serves as a reservoir from which mold material can be continuously fed or pumped as needed within the overall molding system.

The accumulation means comprises a reservoir or accumulator capable of continuously and reliably supplying mold material under sufficient pressure to ensure that a continuous supply of mold material is available under pressure to the delivery means. The accumulation means is preferably capable of temporarily storing enough mold material for a sufficiently large number of delivery cycles without having to be recharged so that it does not prematurely run out of material while the molds are being charged with mold material. A pump or other pressurizing system may preferably be used to transfer mold material from the mixing means to the accumulation means under pressure, such as by means of hoses, pipes or other appropriate conduits.

The delivery means is configured so as to be capable of measuring and delivering a precise quantity of mold material to the mold apparatus each cycle. The delivery means is in constant or periodic fluid communication with the accumulation means, which supplies mold material to the delivery means under pressure upon demand. The delivery is advantageously arranged relative to the mold apparatus so that it can charge a plurality of molds with mold material in a single pass or cycle.

In a preferred embodiment, the accumulation means comprises a cylindrical accumulator with a pneumatically driven piston disposed therewithin. The piston expels mold material from the cylindrical accumulator to the delivery means at a desired pressure. When being charged, the pressure on the piston is relaxed so that the pressure being exerted on the mold material from upstream pumps exceeds the countervailing pressure, if any, that is exerted by the piston. In this manner, the piston is caused to retract by the force of the mold material, which causes the cylindrically shaped accumulator to be charged with mold material. Thereafter, a valve seals off the accumulator from the upstream flow path to prevent backflow of the mold material upstream. Sufficient force is then applied to the piston in order to provide a pressurized supply of mold material to the delivery means upon demand.

In an alternative embodiment, the accumulation means may comprise a flexible accumulator bladder that is capable of expanding or contracting as needed to either receive mold material therein or expel mold material therefrom. The accumulator bladder may advantageously be pressurized, such by being housed within a pressurized chamber, in order to provide mold material to the deliver means under sufficient pressure. An advantage of a flexible accumulator bladder is that it may be recharged at the same time that it is delivering mold material to the delivery means. An advantage of the cylinder/piston accumulator is that it is better able to prevent the buildup of pockets of older mold material. This is particularly advantageous in the case where the mold material tends to lose desired properties over time.

It should be understood that the foregoing examples of accumulation means, namely the cylindrical accumulator and bladder are merely examples of accumulation means that may be employed. The accumulator may in fact have other cross-sectional shapes, such as oval, square, rectangular, and the like, together with a correspondingly-shaped piston or other mechanical expulsion means. In some cases, where the mold material has low viscosity and is able to readily flow by the force of gravity, it may be possible to deliver the mold material to the delivery means under sufficient pressure by means of gravity alone, such as by means of a vertical hopper. Of course, even a hopper can be pressurized, such as by means of pressurized air in the area above the mold material.

Regardless of the specific accumulation means that is employed, it will be preferable for the accumulation means to be configured so that older mold material from previous batches is replaced by newer mold material, which may be referred to as a "first in/first out" system. In other words, it is preferable that pockets of old mold material do not endlessly remain within the accumulator. Continuously cycling mold material from the accumulation means to the delivery means ensures that the mold material will reliably possess the desired rheological and compositional properties in the case where the mold material deteriorates over time.

The delivery means preferably comprises a cylinder and piston combination. The cylinder volume displaced by the piston stroke corresponds to the desired quantity of mold material that is delivered to the mold. The cylinder is first filled with mold material under pressure from the accumulation means. During the filling cycle, the pressure of the mold material from the accumulation means exceeds the countervailing pressure, if any, exerted by the piston. Once the cylinder has been filled with mold material, a pneumatic pinch valve or other appropriating valve means is advantageously employed to sever fluid communication between the cylinder and accumulation means.

During the delivery cycle, the piston exerts enough pressure onto the mold material to expel it out of a delivery orifice into an awaiting mold. The valve means disposed between the cylinder and accumulation means prevents backflow of mold material into the accumulation means. Once the piston has completed its predetermined stroke so as to deliver a predetermined volume of mold material to the mold, a pneumatic pinch valve or other appropriate valve means closes off the delivery orifice so as to prevent premature expulsion of mold material through the orifice during the subsequent filling cycle.

Instead of a cylinder/piston arrangement, the delivery means may alternatively comprise any chamber having a positive displacement device therein that is capable of retracting and advancing in order to measure and deliver a relatively precise quantity of mold material into the mold apparatus. For example, a chamber may be provided having a non cylindrical cross section and mechanical displacement device having a corresponding cross section.

It is therefore an object of the present invention to provide improved methods and systems for metering and delivering a precisely measured quantity of a flowable composition into a mold.

It is a further an object and feature of the present invention to provide methods and systems for metering and delivering a precisely measured quantity of a flowable composition which do not change in response to fluctuations in pressure and rheology of the mold material.

It is also an object of the invention to provide methods and systems for metering and delivering a precisely measured quantity of a flowable material without regard to the number of valves and without regard to whether they are arranged in series or in parallel in relation to the pressurizing means.

It is yet an object of the present invention to provide methods and systems for metering and delivering a precisely measured quantity of a flowable material in order to avoid problems inherent in both under filling and over filling the mold.

It is an additional object of the invention to provide metering and delivery systems that prevent or at least reduce the incidence of inadequately formed or collapsed articles, as well as the quantity flashing that is attached to the demolded articles.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 2B is a close-up perspective plan view of a mold press depicted in FIG. 2A more particularly depicting an exemplary array of depositors according to the invention capable of depositing a dollop of mold material into each female mold half;

FIGS. 3A–3C depict a cross section view of an accumulator according to the invention in the process of being charged with mold material;

FIG. 3D is a side cross section view of the accumulator of FIGS. 3A–3C in the process of providing mold material under pressure to a delivery device manifold;

FIG. 5A is a top view of a delivery system according to the invention, including a delivery device manifold and an array of delivery devices attached thereto;

FIG. 5B is a side view of the delivery device depicted in FIG 5A;

DETAILED DESCRIPTION OF THE PREFERRED EMBODIMENTS

I. Introduction

Figure 1:
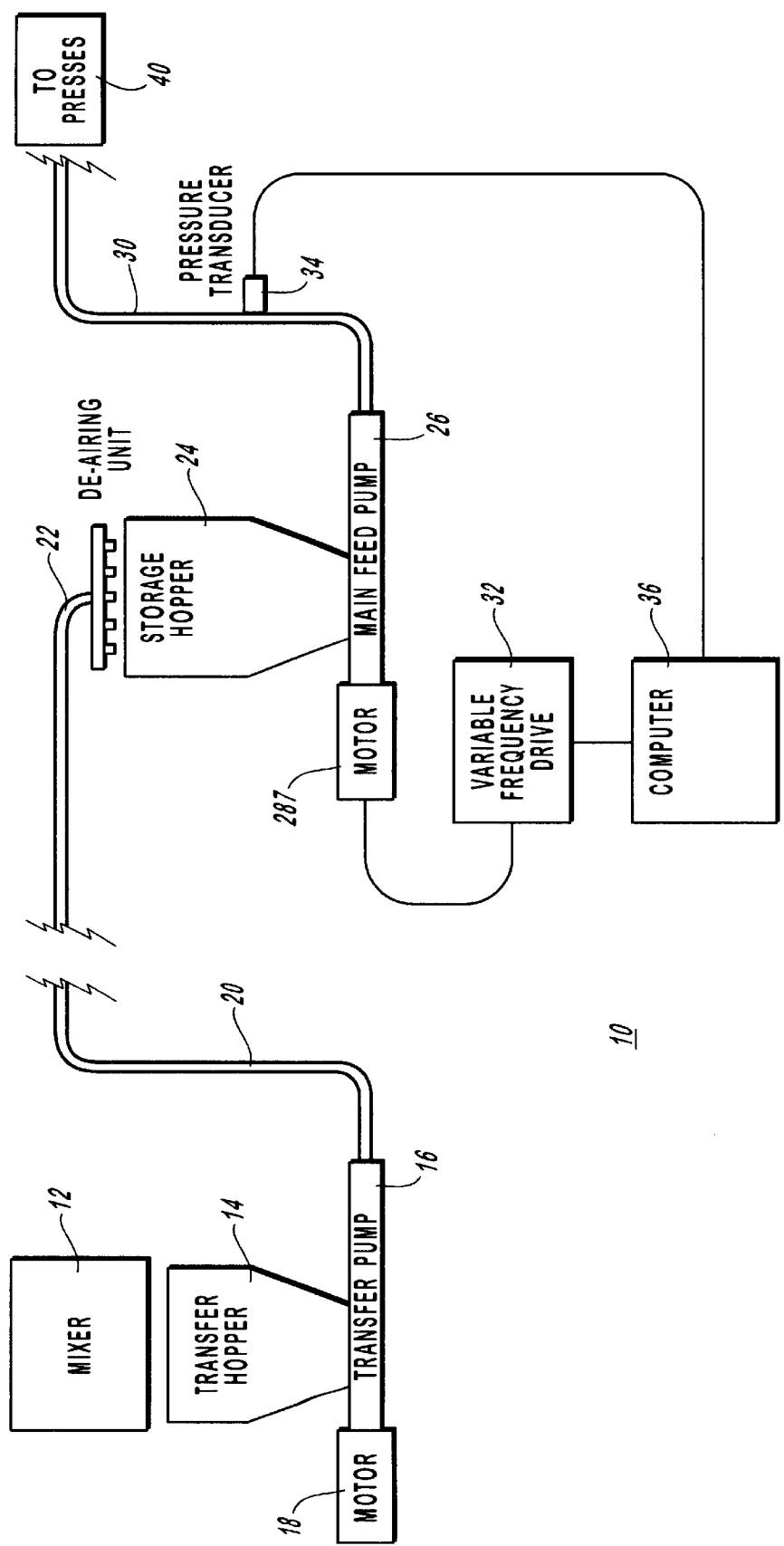
FIG. 1 is a schematic diagram of a system for manufacturing a mold material and delivering it to a mold press according to the invention.

The present invention relates to apparatus and systems for filling a mold with a desired quantity of a flowable mold material or composition. More particularly, the present invention relates to apparatus and systems for metering and delivering a precise quantity of a flowable mold material into a mold during the fabrication of molded articles. The ability to precisely meter and deliver a desired quantity of the mold material results in a more efficient molding process. By doing so, fewer articles are damaged due to under- or over-filling the molds. Moreover, it is possible to more precisely control the level of flashing that is produced during the molding process.

The apparatus and systems of the present invention are particularly well suited for use in metering and delivering a desired quantity of an aqueous composition having a positive yield stress and viscosity. Such compositions include, but are not limited to, aqueous starch-based compositions which are intended to expand when placed into a heated mold, and which yield articles of manufacture having a starch-bound cellular matrix.

A. General Overview of Invention

In general, the inventive metering and delivery systems according to the invention include three basic sections or subsystems: (1) a mixing system or apparatus for mixing together a desired molding composition to be placed into a mold apparatus; (2) an accumulation system or apparatus for receiving, temporarily storing, and delivering the mold composition under pressure to the delivery system; and (3) a delivery system or apparatus for metering and delivering a precise quantity of the mold material into an appropriate mold apparatus. These subsystems are advantageously integrated together to yield a substantially automated mixing, transport, storing, metering and delivery system.

The mixing system typically includes a mixing vessel and a mechanical stirring device capable of imparting a desired level of high or low shear mixing to the combined ingredients. The mixing means may be capable of continuous and/or batch-wise mixing. The mold material is either fed to an intermediate storage unit or delivered directly to the accumulation system.

The accumulation system comprises an accumulator that acts as a temporary reservoir so as to continuously supply mold material under pressure to the delivery means. As discussed below, the accumulator may comprise a variety of pressurized systems, such as a piston-driven cylinder or a flexible bladder.

The delivery system includes apparatus which measures and delivers a desired quantity of the mold material to the mold apparatus, such as by a piston/cylinder arrangement. The delivery means is continuously supplied with sufficient mold material from the accumulation system and is advantageously configured so as to deliver mold material to a plurality of molds.

In order to better understand the nature of how the inventive systems and apparatus for metering and delivering a mold material can be utilized, exemplary compositions and mold apparatus will now be discussed by way of background. It should be kept in mind that the inventive systems and apparatus may be adapted for use with other compositions and mold apparatus, and that following examples are given by way of example only, not by way of limitation.

B. Exemplary Compositions

Substantially all fluid materials may be used with the inventive mold metering and delivery apparatus, perhaps with adaptation depending on the flow properties of the mold material in question. Of particular interest are non-Newtonian fluids. Such fluids include viscous and/or sticky fluid materials, pastes, colloidal suspensions, Newtonian fluids laden with fillers such as fibers, polymers, inorganic aggregates, and the like, and non-Newtonian fluids likewise laden with fibers, polymers, inorganic aggregates, and the like.

Examples of non-Newtonian fluids include Binghamian plastics, Ostwald-de Waele pseudoplastics, Prandtl-Eyring fluids, Ostwald-de Waele diluents, Reiner-Philippoff fluids and Ellis fluids. It is understood that filler-laden fluids may exhibit combinations of non-Newtonian fluid properties. The inventive mold metering apparatus is thus contemplated for use with virtually any type of deformable or flowable material.

One type of non-Newtonian fluid that may be used in the context of the present invention are aqueous compositions which include water, an organic polymer binder, fibers, inorganic aggregate fillers, and other optional components. At least a portion of the organic polymer binder (e.g., starch) is preferably pregelatinized prior to molding in order to increase the viscosity and yield stress of the aqueous fluid fraction. Such compositions are useful in the manufacture of mass-produced articles having an organic polymer-bound cellular matrix. The molded articles may be in the form of containers, separators, dividers, lids, tops, cans, clam-shells, cups, trays, boxes, plates, bowls, other packaging materials, and the like. Alternatively, the compositions may include a hydraulically settable binder, such as portland cement, capable of forming articles of manufacture having high strength.

Examples of aqueous compositions for use in conjunction with the inventive metering and delivery systems of the invention are discussed more fully in U.S. Pat. Nos. 5,376,320; 5,660,900; 5,683,772; 5,385,764; 5,580,624; 5,545,450; 5,662,731, 5,618,341; 5,736,209; and 5,849,155. A further example of compositions that include well dispersed fibers is set forth in copending U.S. application Ser. No. 09/541,331, filed Apr. 3, 2000. For purposes of disclosing exemplary compositions that may be used in conjunction with the inventive metering and delivery systems according to the invention, the foregoing patents and application are incorporated herein by specific reference.

C. Exemplary Mold Apparatus

The mold apparatus that are particularly well suited to receive a molding composition using the metering and delivery systems according to the invention include multi-part molds that can be separated and mated during different times of the molding cycle. The multi-part molds typically include at least a male mold half and a female mold half, although they may include other parts that are brought together during molding. Although the male and female molds may be arranged in any desired orientation, in one embodiment the female mold is situated on the bottom and the male mold is situated above the female mold.

When the molds are separated, the female mold includes an internal area that may advantageously receive a blob or shot of a flowable molding material. Thereafter, upon mating the mold halves together, such as by lowering the male mold into the internal area of the female mold, raising the female mold to meet the male mold, or a combination of the foregoing, the mold halves will define a mold cavity corresponding to the shape of the desired article of manufacture to be molded therewithin. Of course, the metering and delivery apparatus according the invention may be adapted to provide mold material to the male mold, or possibly to the mold cavity itself, such as during an injection molding process.

In the case where an aqueous composition is placed within the mold cavity, it may be advantageous for the mold apparatus to include venting means for allowing at least a portion of the water within the aqueous composition to escape by evaporation. Examples of venting means include, but are not limited to, vent holes and/or a venting ring at the interface between the male and female mold halves.

Examples of mold apparatus for use in conjunction with the inventive metering and delivery systems of the invention are discussed more fully in U.S. Pat. Nos. 5,376,320; 5,660,900; 5,683,772; 5,385,764; 5,580,624; 5,545,450; 5,662,731, 5,618,341; 5,736,209; and 5,849,155. A particularly useful mold press apparatus containing a two-dimensional planar array of male and female mold pairs is set forth in copending U.S. application Ser. No. 09/539,549, filed Mar. 31, 2000. For purposes of disclosing exemplary mold apparatus that may be used in conjunction with the inventive metering and delivery systems according to the invention, the foregoing patents and application are incorporated herein by specific reference.

II. Systems for Metering and Delivering a Composition to a Mold Apparatus

Although the present invention is mainly concerned with metering and delivering a desired quantity of a flowable mold material to a mold apparatus, the overall system for accomplishing this includes various components and subsystems. As discussed above, these include a mixing and transfer system, an accumulation system, and a metering and delivery system. Each one of these subsystems will now be discussed in detail.

A. Mixing and Transfer System

The mixing and transfer system advantageously integrate mixing means and pressurized transport means in order to provide a supply of a desired molding composition to the mold press system, which includes the accumulation system and the metering and delivery system, which will be discussed more fully herein below. As depicted in FIG. 1, an exemplary mixing and transfer system 10 includes a mixing apparatus 12, a transfer hopper 14, a transfer pump 16, which is driven by a pump motor 18, and a flow conduit 20.

The mixing apparatus 12 may include any mixing apparatus known in the art, including, but not limited to, high shear mixers, low shear mixers, twin auger extruders, and the like. Examples of appropriate mixing apparatus within the scope of the invention include the TMN turbo batter mixers available from Franz Haas Waffelmaschinen, Industriegesellschaft mbH., located in Vienna, Austria. High shear mixers are disclosed in U.S. Pat. Nos. 4,225,247, 4,552,463, 4,889,428, 4,944,595, and 5,061,319. For purposes of disclosure, the foregoing patents are incorporated herein by specific reference. Examples of variable speed mixers that can be used to provide both high shear and low shear mixing include the Eirich Rv 11 and the Hobart mixer. Other appropriate mixers include mixers made by Hochmeyer and Marion. Mixing apparatus that may be used to provide compositions on a continuous basis include mixers made by Teledyne and Oakes. A counter-rotational twin auger extruder may be obtained from Buhler-Miag, Inc., located in Minneapolis, Minn.

The transfer hopper 14 typically has a volume sufficient to hold at least one batch of mold mixture produced by the mixing apparatus 12 in the case where the mixing apparatus 12 provides the mold composition in a batch-wise manner. In the case where the mixing apparatus 12 provides mold mixture on a continuous basis, it may be advantageous to eliminate the transfer hopper 14 altogether.

The transfer pump 18 can be any pump known in the art for pumping flowable compositions. It may include, for example, a constant speed pumping system for quick and efficient transfer of mold material from the transfer hopper 14 downstream through the flow conduit 20. The pump motor 18 advantageously includes switching means for activating and deactivating the pump motor 18 when desired. This may occur, for example, where it is desired to pump the entire contents of the transfer hopper 14 through the flow conduit 20. In this case, once the transfer hopper 14 has been emptied, it may be advantageous to switch pump motor 18 off until the transfer hopper 14 has been filled with another batch of mold material and it is desired to pump this material through the flow conduit 20.

As the mold material passes through the flow conduit 20, it may be advantageously treated by a de-airing unit 22 disposed above a temporary storage hopper 24. The de-airing unit 22 can be used to remove air bubbles or air pockets that may have been incorporated within the mold material during the mixing process. Where it is desired to meter and deliver a precise quantity of mold material on a volumetric basis, removing unwanted air from the mold material can greatly improve the accuracy of the metering process.

The storage hopper 24 advantageously holds at least two batches produced by the mixing apparatus 12, in the case batch-wise mixing. In this manner, the storage hopper 24 can advantageously provide a sizeable reservoir of mold material in the case where the mixing process is delayed, such as in order to obtain a fresh supply of raw materials. The temporary storage hopper 24 is emptied by means of a main feed pump 26, which is driven by a variable speed pump motor 28 and connected to a conduit 30 leading to the accumulation system, to be discussed below.

In order to maintain a desired pressure of the mold material within the conduit 30, a variable frequency drive 32 may be provided which interfaces with the pump motor 28 in order to adjust the speed of the motor 28, which in turn controls the pump speed and pressure of the main feed pump 26. A pressure transducer 34 interfaces with the variable frequency drive 32, such as by means of a computer 36 having PID logic control. In this manner, the pressure transducer 34 signals to the pump motor 28 when to speed up or slow down in order to adjust the pressure of the main feed pump 26. The mold material is transferred under variable pressure through the conduit 30 to the mold press system 40, which broadly includes both the accumulation system and the metering and delivery system, which will be discussed in more detail hereinafter.

Figure 2A:
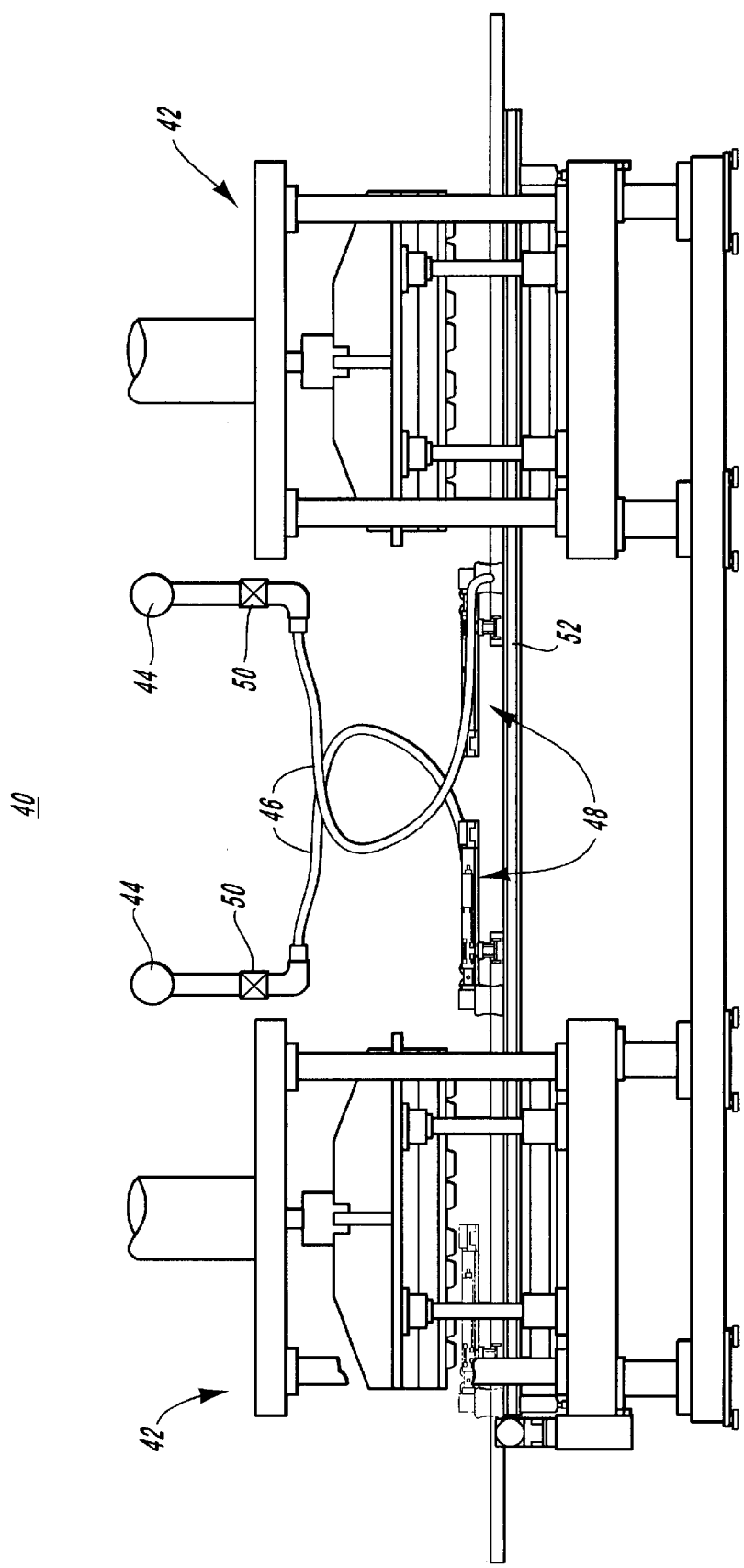
FIG. 2A is a frontal view of a pair of mold presses, each equipped with an inventive delivery device capable of delivering mold material to a plurality of mold halves associated with each mold press.

As illustrated in FIGS. 2A and 2B, the mold press system 40 includes one or more mold presses 42 used to shape or mold the mold material into a desired article of manufacture. The conduit 30 transfers mold material to one or more mix headers 44, which are in fluid communication with one or more depositor feed hoses 46, which transfer the mold material to the depositors 48 via the accumulation system (not shown in detail). One or more main feed ball valves 50 may be used to selectively isolate the depositor feed hoses 46 from the main headers 44.

The depositor 48 associated with each mold press 42 advantageously supplies mold material to a plurality of molds within each mold press 42. In order to facilitate the ability to efficiently deposit mold material into a plurality of molds, the depositors 48 may advantageously be movable with respect to the mold press 42. The mobility of the depositors 48 may be facilitated, for example, by means of a depositor rail system 52.

As more particularly depicted in FIG. 2B, the depositor rail system 52 allows for substantially planer movement of the depositors 48 above an array of female molds 54, which advantageously face upwardly so as to receive a quantity of mold material therein from the depositors 48. Once the female molds 54 have been filled with mold material, a planar array of male molds 56 is brought into a mating configuration with the female molds 54 so as to shape the mold material into a plurality of desired articles of manufacture. An important feature of the present invention more particularly involves the manner in which a desired quantity of mold material is deposited into the female molds 54 within the mold press 42. A detailed description of the accumulation system and metering and delivery system for depositing a precise quantity of mold material will now be provided.

B. Accumulation System

The metering and delivery system to be discussed hereinbelow, is responsible for actually measuring and delivering the mold material into the molds. Nevertheless, the accumulation system is an important component of the metering and delivery system because it is responsible for providing a reliable supply of the mold material to the metering and delivery system under pressure upon demand. An accumulation system 60 within the scope of the invention is illustrated in FIGS. 3A–3D.

FIGS. 3A–3D more particularly depict an accumulator 62 which defines an interior region or cylinder 64, which provides a temporary storage area for the mold material prior to be delivered to the metering and delivery system. A piston 66, such as a pneumatically driven piston, is capable of selectively withdrawing and advancing in order to accept and then pressurize the mold material 76. The piston 66 may advantageously be driven or advanced by means of a pressurized air supply 68, which is pressurized to a desired air pressure corresponding to the amount of force with which it is desired to drive the piston 66. A solenoid valve 70 may be selectively opened and closed in order to intermittently allow pressurized air to drive the piston 66 in order to force mold material 76 into a manifold 72 of the metering and delivery system, or to allow the piston 66 to withdraw during filling of the cylinder 64 with mold material 76. When the solenoid valve 70 is closed, venting means such as a bleeder valve (not shown) allows for the venting of air from the cylinder 64 on the air side of the piston 66 in order to allow the piston 66 to retract as mold material 76 enters the cylinder 64.

An accumulator feed pinch valve 74 may be selectively opened and closed in order to intermittently provide mold material 76 from the depositor feed hose 46 to the accumulator 62, and in order to isolate the accumulator 62 from the depositor feed hose 46. A separator 78 is disposed between where the mold material 76 is introduced into the accumulator cylinder 64 from the depositor feed hose 46 and where the mold material 76 exists into the manifold 72. In this manner, the separator 78 provides for an approximate "first in/first out" system of delivering mold material from the cylinder 64 into the manifold 72.

A mix seal 80 disposed around the circumference of the piston 66 near the mold material side of the piston 66 provides a fluid tight seal between the piston 66 and the interior wall of the cylinder 64. The mix seal 80 prevents mold material 76 from flowing past the piston 66 into the air side of the piston 66. Similarly, an air seal 82 disposed around the circumference of the piston 66 near the air side of the piston 66 provides an air tight seal between the piston 66 and the cylinder 64. This prevents air from passing from the air side of the piston 66 into the mold material side of the piston 66. In this way, the piston will not develop pockets of mold material 76 on the air side of the piston 66 nor pockets of air on the mold material side of the piston 66 during the cyclical processes of filling and emptying the accumulator 62.

Disposed along the interior wall of the cylinder 64 is a normal fill sensor 84, which senses when the piston 66 has been retracted during a fill cycle to a position where the cylinder 64 has been loaded with a normal fill quantity of mold material 76. An overfill alarm sensor 86 detects when the piston 66 has retracted too far such that the accumulator 62 has been overfilled. A central processing unit (not shown) may or may not trigger an emergency response in response to triggering of the overfill alarm sensor 86.

A normal end of cycle sensor 88 detects when the piston 66 has reached a position where a normal quantity of mold material 26 has been expelled from the accumulator cylinder 64 into the manifold 72. When the normal end of cycle sensor 88 is triggered, a central processing unit (not shown) will typically signal the main ball valve 50 and the feed pinch valve 74 to open, while simultaneously signalling to the solenoid valve 70 to close in order to cut off the air pressure on the air side of the piston 66, in order to cause the accumulator cylinder 64 to be filled with fresh mold material 76. If, for some reason, this does not occur, an accumulator empty alarm sensor 90, when triggered by the piston 66, tells the central processing unit that the accumulator 62 has reached a substantially empty state such that no further mold material 76 can be adequately supplied to meet the needs of the metering and delivery system. Appropriate shut-down measures may advantageously be taken if the accumulator alarm system 90 is triggered.

In order to illustrate how the accumulator system 60 operates, reference is now made to FIGS. 3A–3D in sequence. FIG. 3A depicts the start of a fill sequence, in which the main ball valve 50 and accumulator pinch feed valve 74 are opened, the solenoid valve 70 associated with the pressurized air supply 68 is closed, and an air vent (not shown) is open, thereby venting the air side of the piston 66 to the atmosphere. This allows the accumulator 62 to fill with mold material 76, which pushes the piston 66 towards the back of the accumulator 62. Depending on the pressure in the mix header 44, the filling step may take as little as 5 seconds or as long as 30 seconds.

As shown in FIG. 3B, as the piston 66 reaches a normal fill position, indicated by the middle of the piston 66 triggering the normal fill sensor 84, the control system closes the main feed ball valve 50, thereby isolating the accumulator 62 from the mix pressure in the header 44. The feed pinch valve 74 remains open for an appropriate period of time in order for residual pressure in the depositor feed hose 46 to continue feeding pressurized mold material 76 into the accumulator 62. This causes the piston 66 to continue withdrawing slightly beyond the normal fill sensor 84.

As depicted in FIG. 3C, when the mix pressure within the feed hose 46 and accumulator 62 drops to zero, or nearly zero, the accumulator pinch valve 74 is closed, thereby isolating the accumulator 62 from the depositor feed hose 46. At this point, the accumulator 62 is ready to provide mold material 76 to the metering and delivery system.

As depicted in FIG. 3D, pressurizing the air side of the piston 66 by means of the pressurized air supply 68 causes the piston 66 to force mold material 76 through the manifold 72 under pressure in order to supply the metering and delivery system with pressurized mold material. The accumulator pinch valve 74 prevents mold material 76 from being pushed back into the feed hose 46. The air side of the piston 66 is pressurized by opening the solenoid valve 70 in order to provide communication between the air side of the piston 66 and the pressurized air supply 68. The air vent (not shown) is also closed. The air side of the cylinder 64 is by this means pressurized to an appropriate pressure in order to cause the piston 66 to exert the desired level of force onto the mold material 76. The presently preferred air pressure is approximately 30 psi. Because the piston 66 is free to move within the cylinder 64, the mold material 76 is likewise pressurized to approximately 30 psi. In this state, the depositor is ready for a deposition cycle.

During the deposition cycle, the accumulator 62 supplies mold material 76 at approximately 30 psi to the manifold 72, which in turn supplies each of the depositors 48 used to meter and deliver the mold material to each mold apparatus with adequate mold material 76. As the piston 66 reaches the normal end of cycle sensor 88, the central processing system normally responds by repeating the filling and depositing cycle, as discussed above. If the piston 66 ever reaches the accumulator empty alarm sensor 90, in which case the mold material side of the piston 66 would also likely make abutment with the separator 78, the central processing may be programmed to make an appropriate response, such as shutting down the mold press apparatus or quickly filling the accumulator 62 with additional mold material 76.

Figure 4:
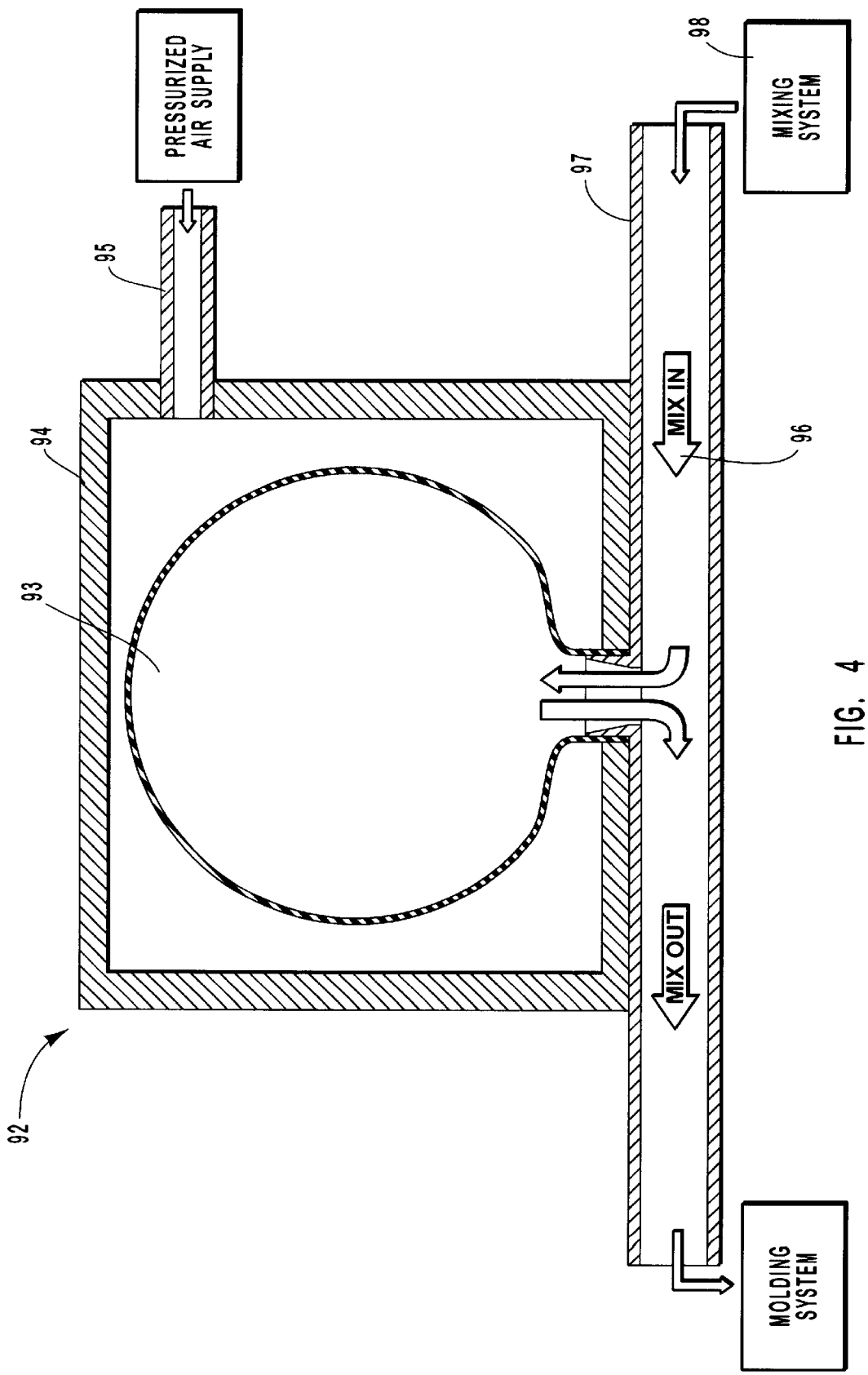
FIG. 4 is a side cross section view of an alternative embodiment of an accumulator having an expandable bladder within a pressurized chamber.

An alternative embodiment of accumulation means is depicted in FIG. 4. In this embodiment, an accumulator 92 includes a flexible accumulator bladder 93 that is capable of expanding or contracting as needed to either receive mold material therein or expel mold material therefrom. The accumulator bladder 93 may advantageously be pressurized, such by being housed within a pressurized chamber 94, in order to provide mold material to the deliver means under a desired pressure. The pressurized chamber may be pressurized by, e.g., a pressurized air supply 95. Mold material 96 is able to flow towards and into the accumulator bladder 93 by means of a flow conduit 97. Mold material 96 is likewise able to flow out of and away from the accumulator bladder 93 by means of the flow conduit 97. Mold material is initially provided to the flow conduit 97 by a mixing system 98, which is temporarily stored within the accumulator bladder 93 until needed. The mold material 96 is provided to a molding system 99 under pressure upon demand. An advantage of the flexible accumulator bladder 93 is that it may be recharged and provide mold material 96 to the molding system 99 simultaneously.

C. Metering and Delivery System

The metering and delivery system is the apparatus responsible for metering and delivering a precise quantity of mold material to the mold apparatus. FIGS. 5A and 5B depict a metering and delivery system 100 including a plurality (e.g. 8) depositors 48 in a spaced-apart relationship corresponding to the spacing of an array of female molds (FIG. 2B). The number of depositors will typically correspond to the number of molds in a row, and may be as few as 1 and as many as are feasible. As more particularly shown in FIG. 5B, the depositors 48 are in fluid communication with the accumulator 62 by means of the manifold 72. As the array of depositors 48 move along the depositor rail system 52 (FIGS. 2A and 2B), the depositors 48 are able to provide mold material to a plurality of rows of molds.

As better seen in FIGS. 6A–6F, each depositor 48 further includes a metering cylinder 102, a metering piston 104 disposed within the metering cylinder 102, an air drive cylinder 106 in gaseous communication with the metering piston 104, and pressurizing and depressurizing means (not shown), such as a pressurized air supply and appropriate valve apparatus (not shown). The metering piston 104, in combination with the metering cylinder 102, is responsible for both metering a desired quantity of mold material 76 and providing the force necessary to expel the mold material into an awaiting mold apparatus. In particular, during the filling and metering cycle, the metering piston 104 is caused to retract a predetermined distance, and during the depositing cycle the piston 104 forces a desired quantity of mold material 76 into an awaiting mold apparatus by advancing the predetermined distance.

The air drive cylinder 106 is responsible for pressurizing the metering piston 104 during the deposit stroke. The pressuring and depressurizing means (not shown) provides air pressure to the air drive cylinder 106 during the depositing stroke and also allows for venting of the air drive cylinder 106 during the filling and metering stroke of the piston 104. A cup seal 108 on the forward end of the metering piston 104 provides a fluid tight seal between the piston 104 and the metering cylinder 102 in order to prevent mold material 76 from entering into the air drive cylinder 106.

Each depositor 48 further includes a fill pinch valve 110, a deposit pinch valve 112, a flow chamber 114 disposed between the fill pinch valve 110 and the metering cylinder 102, and a mold material deposit branch 116 disposed between the flow chamber 114 and the deposit pinch valve 112. When the fill pinch valve 110 is opened, mold material 76 enters into the flow chamber 114 which, together with residual mold material 76 remaining within the flow chamber 114 after a delivery cycle, forces the metering piston 104 to retract within the metering cylinder 102 under pressure. In order to provide mold material to a mold apparatus after the piston 104 has been fully retracted, the fill pinch valve 110 is closed, the deposit pinch valve 112 is opened, and the metering piston 104 is advanced by means of air pressure within the air drive cylinder 106. The mold material 76 is forced under pressure through the deposit branch 116 and is caused to exit the depositor 48 through a deposit orifice 118 defined by the opened deposit pinch valve 112 in the form of a metered dollop 120 having a desired volume. The volume of the dollop 120 substantially corresponds to the volume of the stroke defined by the metering piston 104 within the metering cylinder 102.

The sequential operation of the metering and delivery system according to the exemplary metering and delivery system is sequentially illustrated by FIGS. 6A–6F. The depositor 48 depicted in 6A is ready for the beginning of the metering and delivery cycle. The fill pinch valve 110 and the deposit pinch valve 112 are both closed by means of pressurized air at 70 psi. The metering piston 104 is fully extended. The accumulator 62 and manifold 72 are pressurized with mold material 76. The pinch valves 110 and 112 are controlled by means of a solenoid valve block (not shown) mounted on the depositor frame. Quick opening of the pinch valves may be accomplished using quick exhaust valves (not shown) in the air port (not shown) on each pinch valve housing. The air drive cylinder 106 is vented to the atmosphere and not pressurized so as to allow retraction of the metering piston 104 as mold material is allowed to fill the metering chamber 114.

Figure 6A:
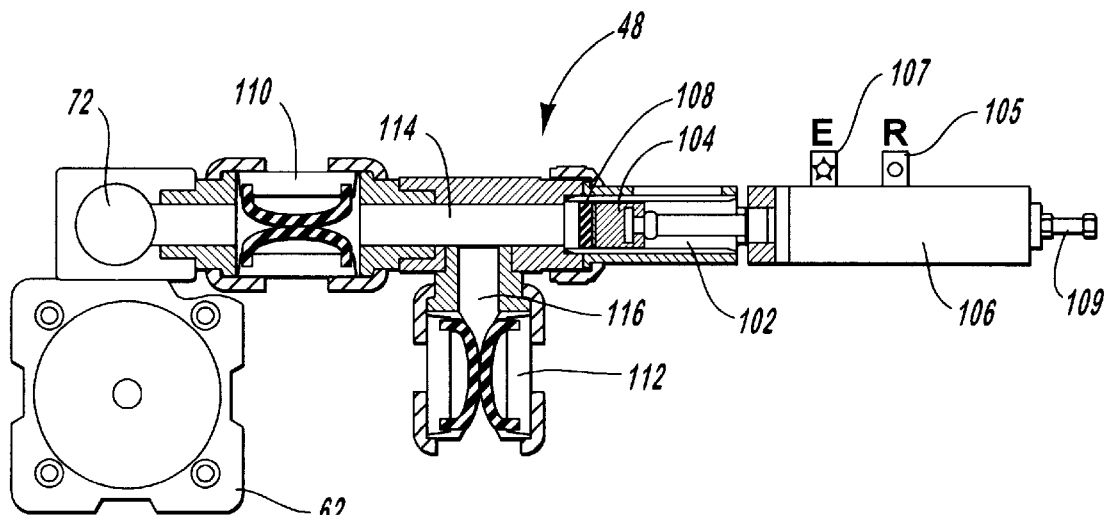
FIGS. 6A–6C depict a cross section view of a delivery device according to the invention which includes a cylinder and piston in the process of being filled with a flowable mold material.
Figure 6B:
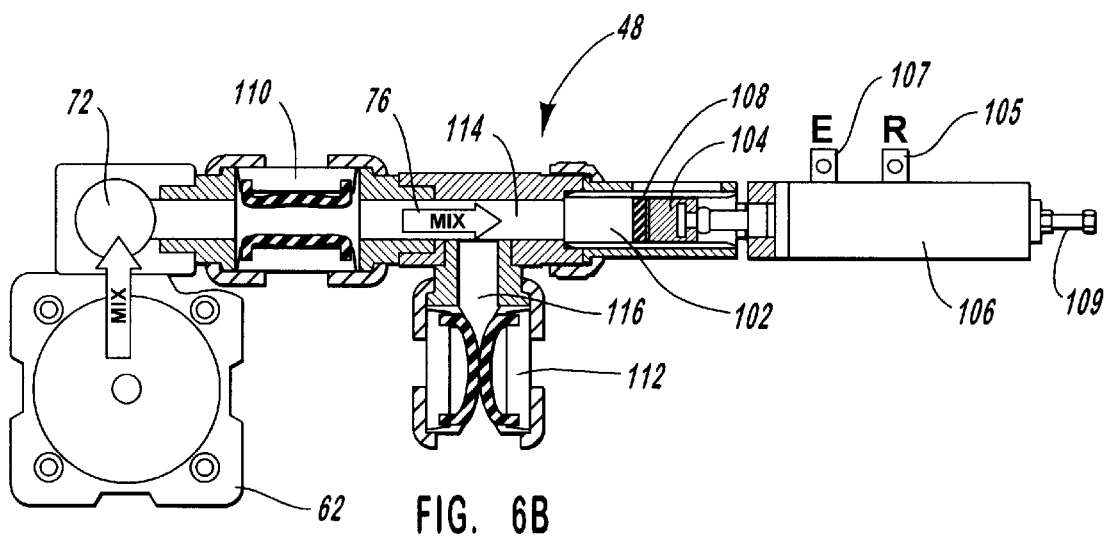

FIG. 6B depicts the filling step in which the metering cylinder 102 is filled with fresh mold material to be deposited later into a mold. This is accomplished by opening the fill pinch valve 110, such as by actuating a quick exhaust valve (not shown), thus venting into the atmosphere that air pressure that previously forced the fill pinch valve 110 to remain sealed. Opening the pinch fill valve 110 allows mold material 76 to flow into the metering cylinder 102 under pressure, thereby pushing the metering piston 104 back into a retracted position. When the metering piston 104 reaches a fully retracted position, a piston retracted sensor 105 is triggered. The central processing system waits until the piston retract sensors are enabled on all 8 depositors 48 before sending any further signals to the depositors 48.

Figure 6C:
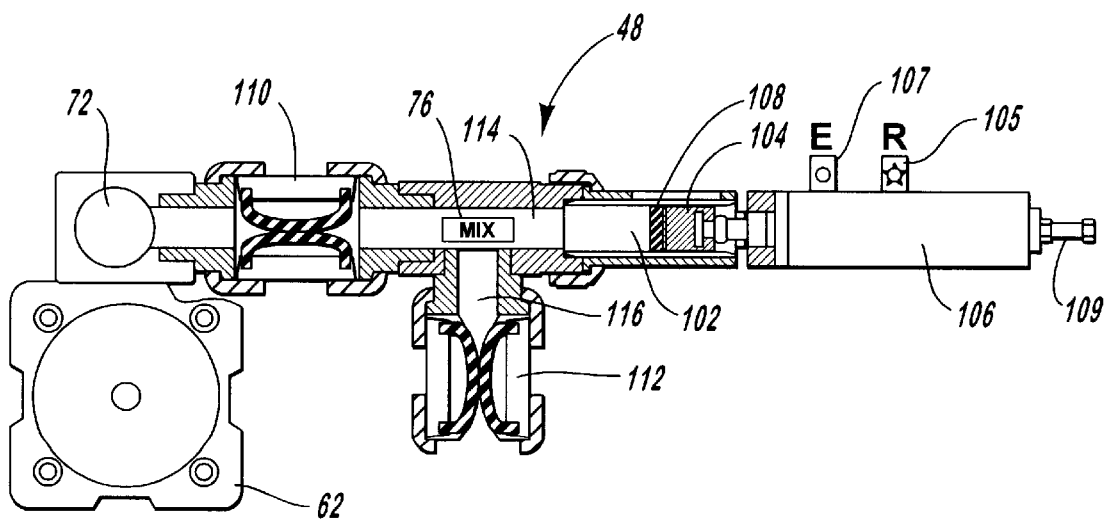

As depicted in FIG. 6C, when all of the depositors 48 have been fully filled with mold material 76, the fill pinch valves 110 are closed by being pressurized to 70 psi, thus isolating the metering cylinder 102 from the manifold 72 and accumulator 62. A slight delay, such as a 0.2 second delay, may be provided to ensure that all 8 fill pinch valves 110 are fully closed before commencing the next step of the process.

Figure 6D:
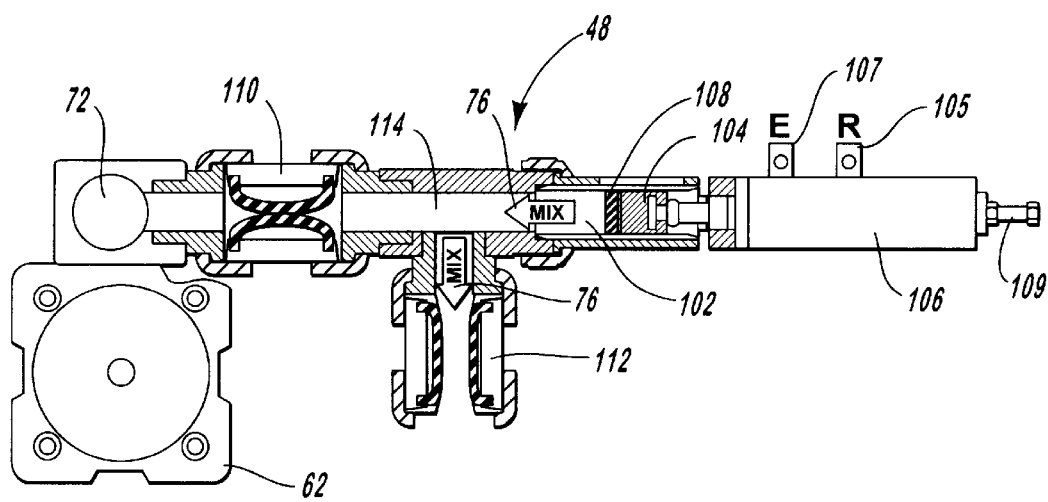
FIGS. 6D–6F depict a cross section view of the delivery device of FIGS. 6A–6C in the process of delivering a flowable mold material into a mold.
Figure 6E:
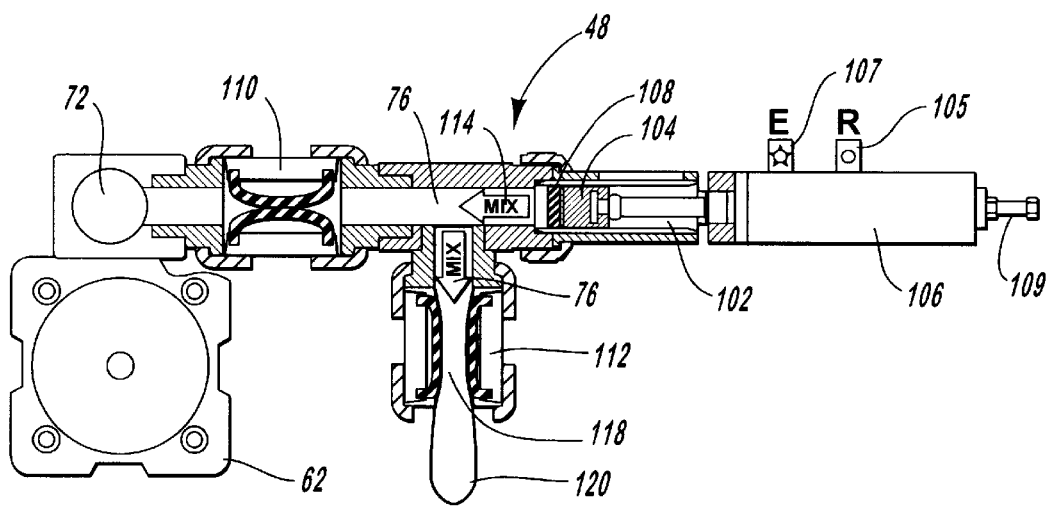

FIG. 6D illustrates the commencement of the depositing step. The deposit pinch valve 112 is opened by removing the air pressure surrounding the deposit pinch valve 112, such as by actuating a quick exhaust valve (not shown). At the same time, the air drive cylinder 106 is pressurized to 50 psi in order to urge the metering piston 104 forward. Compressed air is allowed to enter the air drive cylinder 106 from the pressurizing and depressurizing means (not shown) by means of, e.g., a solenoid valve (not shown). At this point the mold material 76 begins to be pushed from the flow chamber 114, through the deposit branch 116, and out the deposit orifice 118 defined by the open deposit pinch valve 112. FIG. 6E depicts the final stages of the depositing cycle as the metering piston 104 is fully extended.

Figure 6F:
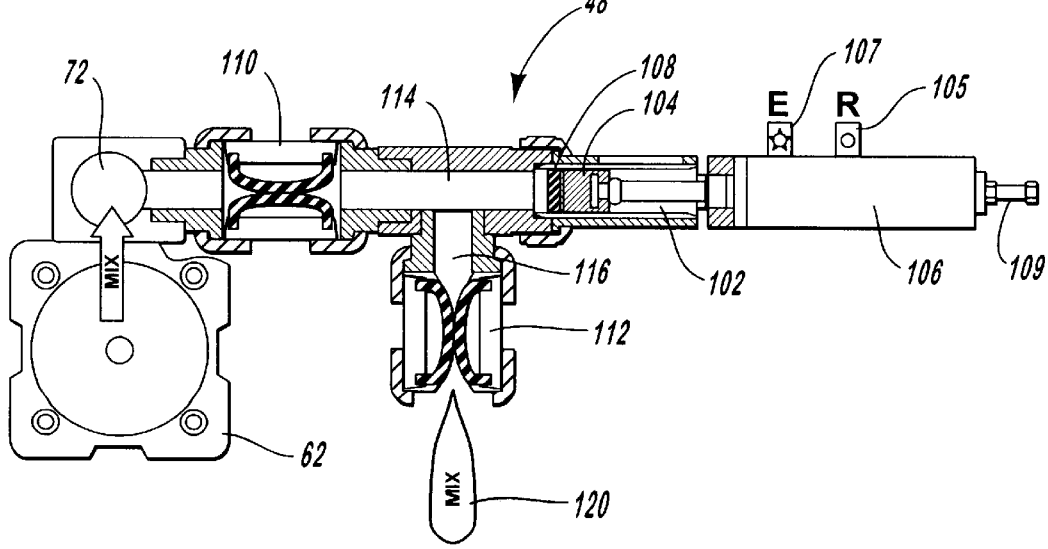

As depicted in FIG. 6F, upon expelling the desired quantity of mold material 76 through the depositor orifice 118 by means of the metering piston 104 advancing a predetermined stroke length, the deposit pinch valve 112 is closed by pressurizing the pinch valve to 70 psi. When the metering piston 104 is extended to the desired stroke length, a piston extended to sensor 107 will be triggered. At this point, the central processing unit will cut off pressure to the metering piston 104, such as by means of actuating a quick exhaust valve (not shown) and cutting off air pressure to the air drive cylinder 106.

Closing of the deposit pinch valve 112 causes the mix dollop 120 to be cut off from the deposit pinch valve 112 and fall away or be pushed away from the depositor 48 as a coherent lump. Closing the deposit pinch valve 112 also prevents any mold material 76 from falling from the flow chamber 114 through the deposit orifice 118 by the force of gravity. A delay may be provided, such as a delay of 0.1 second, before commencing the next step to ensure that all 8 deposit pinch valves 112 have been fully closed.

Before depositing a new dollop of mold material, the depositors 48 move along the depositor rail system 52 so as to be properly situated above the next row of female molds 54 (FIG. 2B), and the cycle as described above is repeated. In this manner, the depositors 48 are able to fill an entire two-dimensional array of female molds 54. In view of the quick sequential filling of different rows of female molds, the accumulator system will preferably include sufficient mold material so as to supply the depositors with sufficient mold material in order to fill an entire array of female molds without interruption.

In general, the volume of mold material delivered to the mold system during each cycle will correspond, and generally be equivalent, to the interior volume of the cylinder defined by the stroke length, or displacement, of the metering piston 104 with the metering cylinder 102 during the filling and delivery cycles. Thus, if the radius of the interior volume of the metering cylinder 102 is known, one can readily calculate the volume of mold material that is delivered to the mold by measuring the stroke length of the metering piston 104 according to the following equation:

$$\text{Volume} = \pi r^2 l$$

where, r=cylinder radius and l=piston stroke length.

In order to adjust the amount of mold material that is delivered to the mold during each cycle, one need only lengthen or shorten the stroke length, or displacement, of the metering piston 104. The stroke length can be adjusted by providing adjustable stopping means that limit, and thus define, the total stroke length of the piston. In the case of the depositors 48, adjustments to the piston stroke length are made by means of an adjustment bolt 109. Changes in the piston stroke length will correspond to proportional deposit changes in the volume of mold material that is delivered to the mold during each cycle. The optimal amount of mold material will, in turn, be determined by certain variables, such as the volume of the mold cavity upon closing the mold halves together, the temperature of the molds, the amount of expansion, if any, of the mold material during the molding process, and the number of vent holes in the mold, and the like.

The valves between the various sections of the inventive metering and delivery system may comprise any appropriate valve known in the art. In general, the valves should be capable of opening and closing repeatedly and over a large period of time. Moreover, such valves should not be prone to wear out or otherwise be damaged when exposed to the starch-based compositions being employed, particularly those that contain abrasive mineral filler particles. In a preferred embodiment, some or all of the valves will comprise flexible pinch valves that respond to changes in pressure applied to both the interior and exterior of the pinch valves and which are configured to remain open when not being acted upon by any external pressure. The valves are closed or sealed by applying an external pressure to the exterior of the flexible pinch valve material great enough to overcome the natural resilience of the pinch valve material and also the pressure, if any, being exerted by the mold material within the interior of the pinch valve. Because they typically comprise a resilient and compliant material, pinch valves do not generally experience much wear.

Alternatively, some or all of the valves may comprise pressure sensitive one-way valves. Such valves are normally closed until mold material is forced through the valves at a pressure beyond a minimum threshold. Because such valves are one-way, they can prevent unwanted backflow of mold material. A combination of pinch valves and one-way valves may be employed, and the one-way valves may themselves be variations of a pinch valve. Another type of valve is a ball valve, which is capable of sealing off at extremely high pressures. Notwithstanding, it is certainly within the scope of the invention to employ any of a large variety of appropriate valves known in the art.

In a presently preferred embodiment, the pinch valves comprise Molythane®, a proprietary urethane-based elastomer manufactured by Bimba Pneumatics.

V. Summary

The present invention is directed to an inventive mold material metering apparatus and systems for precisely and repeatably delivering a desired volume of a mold material in the fabrication of molded articles. The inventive apparatus and systems overcome several prior art problems that resulted in unreliable and uneven delivery of mold material quantities for formation within a mold cavity. This in turn overcomes problems inherent in under filling or overfilling the molds. In this way the inventive apparatus and systems substantially reduce the number of processing variables that are required to be monitored and correlated in the prior art to respond to process feed stream disturbances or variations between process feed stream batches.

The present invention thus provides improved methods and systems for metering and delivering a precisely measured quantity of a flowable composition into a mold.

The present invention further provides methods and systems for metering and delivering a precisely measured quantity of a flowable composition which do not change in response to fluctuations in pressure and rheology of the mold material.

The invention also provides methods and systems for metering and delivering a precisely measured quantity of a flowable material without regard to the number of valves and without regard to whether they are arranged in series or in parallel in relation to the pressurizing means.

The present invention additionally provides methods and systems for metering and delivering a precisely measured quantity of a flowable material in order to avoid problems inherent in both under filling and over filling the mold.

The invention yet provides metering and delivery systems that prevent or at least reduce the incidence of inadequately formed or collapsed articles, as well as the quantity flashing that is attached to the demolded articles.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for depositing a desired quantity of a mold composition into a mold comprising:
   a metering and delivery device configured so as to meter and then deliver a desired volume of mold material to at least one mold, said metering and delivery device including a metering cylinder and a metering piston disposed therein, said metering piston having a stroke length that defines a volume corresponding to the volume of mold material that is delivered to the mold; and
   an accumulator which receives and temporarily stores mold material and then provides the mold material under pressure to the metering and delivery device.

2. A system as defined in claim 1, wherein the metering piston is pneumatically actuated.

3. A system as defined in claim 1, wherein the accumulator includes an accumulation cylinder and a piston.

4. A system as defined in claim 3, wherein the piston of the accumulator is pneumatically actuated.

5. A system as defined in claim 1, wherein the accumulator includes a flexible bladder that is externally pressurized so as to continuously provide mold material to the metering and delivery device upon demand.

6. A system as defined in claim 1, wherein the system includes a plurality of metering and delivery devices in order to meter and deliver mold material to a plurality of molds simultaneously.

7. A system as defined in claim 1, wherein the metering and delivery device includes a fill pinch valve in fluid communication with the metering cylinder that, when opened, allows mold material to enter the metering cylinder, which causes the metering piston to be withdrawn.

8. A system as defined in claim 7, wherein the fill pinch valve is pneumatically actuated.

9. A system as defined in claim 1, wherein the metering and delivery device includes a deposit pinch valve in fluid communication with the metering cylinder that, when opened, allows mold material to be deposited into a mold under pressure exerted by advancement of the metering piston within the metering cylinder.

10. A system as defined in claim 9, wherein the deposit pinch valve is pneumatically actuated.

11. A system as defined in claim 1, wherein the mold material comprises an aqueous starch-based composition.

12. A system for depositing a desired quantity of a mold composition into a mold comprising:
    metering and delivering means for metering and delivering a desired volume of mold material to at least one mold with a single stroke of the metering and delivering means; and
    accumulation means for receiving and temporarily storing mold material and then providing the mold material under pressure to the metering and delivery means.

13. A system for depositing a desired quantity of a mold composition into a mold comprising:
    a plurality of metering and delivery devices configured so as to meter and then deliver a desired volume of mold material to a plurality of corresponding molds, each metering and delivery device including a metering cylinder and a metering piston disposed therein, the metering piston having a stroke length that defines a volume corresponding to the volume of mold material that is delivered to a corresponding mold; and
    an accumulator which receives and temporarily stores mold material and then provides the mold material under pressure to the metering and delivery devices.

14. A system as defined in claim 13, wherein the metering piston is pneumatically actuated.

15. A system as defined in claim 13, wherein the accumulator includes an accumulation cylinder and a piston that is pneumatically actuated.

16. A system as defined in claim 13, wherein each metering and delivery device includes a fill pinch valve in fluid communication with the metering cylinder that, when opened, allows mold material to enter the metering cylinder and cause the metering piston to be withdrawn.

17. A system as defined in claim 16, wherein the fill pinch valve is pneumatically actuated.

18. A system as defined in claim 13, wherein each metering and delivery device includes a deposit pinch valve in fluid communication with the metering cylinder that, when opened, allows mold material to be deposited into a mold under pressure exerted by advancement of the metering piston within the metering cylinder.

19. A system as defined in claim 18, wherein the deposit pinch valve is pneumatically actuated.

20. A system as defined in claim 13, wherein the mold material comprises an aqueous starch-based composition.

* * * * *

UNITED STATES PATENT AND TRADEMARK OFFICE
CERTIFICATE OF CORRECTION

| | | |
|---|---|---|
| PATENT NO. | : 6,347,934 B1 | Page 1 of 1 |
| DATED | : February 19, 2002 | |
| INVENTOR(S) | : Per Just Andersen, Kristopher R. Turner, Matthew E. Laine and David A. Dellinger | |

It is certified that error appears in the above-identified patent and that said Letters Patent is hereby corrected as shown below:

Title page,
Item [56], U.S. PATENT DOCUMENTS, change "Anderson" to -- Andersen et al. --
ABSTRACT,
Line 6, after "demand" insert a period Drawings,
Figure 4, insert reference number -- 99 -- and a lead line pointing to the box labeled "MOLDING SYSTEM"

Column 2,
Line 14, after "reduced" insert -- if --
Line 15, before "introduced" insert -- is --

Column 10,
Line 24, after "case" insert -- of --

Column 11,
Line 53, after "material 76" change "exists" to -- exits --

Column 12,
Line 16, after "material" change "26" to -- 76 --

Column 13,
Line 51, before "depositors" change "8)" to unbolded -- 8) --

Column 14,
Line 12, before "and depressurizing" change "pressuring" to -- pressurizing --

Signed and Sealed this

Fifteenth Day of October, 2002

*Attest:*

JAMES E. ROGAN
*Attesting Officer*     *Director of the United States Patent and Trademark Office*